HIGH SPEED DATA TRANSMISSION SYSTEM

Filed Dec. 17, 1962 2 Sheets-Sheet 1

INVENTOR.
ADAM LENDER
BY
Lippincott, Ralls & Hendricson
ATTORNEYS

INVENTOR.
ADAM LENDER
BY
Lippincott, Ralls & Hendricson
ATTORNEYS

United States Patent Office 3,234,465
Patented Feb. 8, 1966

3,234,465

HIGH SPEED DATA TRANSMISSION SYSTEM

Adam Lender, Palo Alto, Calif., assignor, by mesne assignments, to Automatic Electric Laboratories, Inc., Northlake, Ill., a corporation of Delaware Filed Dec. 17, 1962, Ser. No. 245,324
1 Claim. (Cl. 325—42)

This invention relates to improved apparatus for electrical transmission of binary data over a communications channel of limited frequency bandwidth. More specifically, the invention provides a means for transmitting binary data at twice the bit rate previously believed maximum using a conventional binary method, yet in spite of this substantial increase in transmission rate, the original binary data can be unambiguously reconstructed from the signal at the receiving end. This invention is a continuation-in-part of my copending application Serial No. 206,747, filed July 2, 1962, assigned to the same assignee as this invention.

It is well known in the art that the maximum transmission rate possible over a transmission channel of limited bandwidth is set by Nyquist's rule. For binary data $C=2f$, where C is the maximum transmission rate in bits per second, and $f$ is the frequency bandwidth limit of the system. All data communication systems have a frequency bandwidth limit, which may arise in the sending equipment, the receiving equipment, the transmission equipment, or the transmission medium. Since it is almost always desirable to transmit the most possible data in the available frequency bandwidth, a higher bit rate is possible with conventional systems if the data is coded in a number system having a base greater than 2. With quaternary data, for example, $C=4f$. Many communication ssytems, therefore, use the quaternary base in order to double the transmission rate. The resultant increase in speed, however, is paid for by concomitant disadvantages. First, quaternary systems are considerably more sensitive to noise, giving rise to a larger number of errors for a given noise level. Second, the complexity of the transmission equipment is approximately doubled for a quaternary system.

This invention provides new apparatus for a binary data communication system which permits a maximum transmission speed twice that heretofore thought possible for binary data (using Nyquist's rule). The maximum bit speed in this invention is the same as that previously possible only with a quaternary system; yet the sensitivity to noise is 3.6 db less than with a quaternary system, and the complexity of the required equipment (in a preferred embodiment of the invention) is about equal to that of the conventional binary system—or about half that of a conventional quaternary system. Additionally, the intersymbol interference is substantially less than that in a quaternary system.

Briefly, the apparatus of this invention includes a means for supplying to the transmission channel electric pulses representing binary data for transmission at a bit rate up to four times the frequency bandwidth limit of the transmission channel. Because the data waveform at such a high bit rate (relative to the bandwidth of the transmission channel) contains essential frequency components which the transmission channel cannot transmit, the data waveform is not transmitted through the channel in its original form. Nevertheless, the received signal will be one from which the original data can be reconstructed, in accordance with this invention.

Although not essential to the invention, an improvement in signal-to-noise ratio and greater flexibility in transmission bit rate may be obtained by including an arithmetical summer in the pulse supply. Such a summer adds the data pulse waveform to a second waveform which is identical in shape to the original, but delayed by one bit. In this fashion the transmitted signal is converted to the shape in which it is to be received before it is passed through the transmission medium. Although the addition of the arithmetical summer would, at first glance, appear to add equipment to the system, in actual practice the overall expense may be reduced, because the summer substantially lessens the critical tolerances imposed on later equipment in the system. In general, any tolerance reduction results in a decrease in manufacturing cost.

The receiving apparatus of this invention provides means for detection and reconstruction of the electric pulses representing the original binary data from the output of the transmission medium. The data detection and reconstruction apparatus has no memory, because all decisions are based on single pulses. Thus, any multiplication of errors resulting from a system which must make logical decisions based upon more than one pulse is eliminated.

A retiming circuit may be used in the detection and reconstruction portion of the system; however, it is a very important feature of the invention's improved system that such a circuit is not essential, and is not used, in a very large number of applications. The system disclosed earlier, in the parent application, always required a retiming circuit. Retiming is not needed, with this invention, when the amount of time jitter due to transmission distortion is small compared to the bit duration. Moreover, in teletype transmission where the synchronization is an integral function of the start and stop signals, retiming is unnecessary.

One advantage of eliminating the retiming circuit is that the clock pulse generator (in the detection and reconstruction portion of the apparatus) is eliminated. There is, however, another advantage even more important, although less immediately apparent. Bit speed in the transmitter is forever limited by the speed of a clock pulse generator in the receiver. Substantial modification of the receiver is necessary before bit speed of transmission can be modified. The receiver in the improved system of this invention where no retiming circuit is used can accept signals transmitted at any bit speed within the operating range of the invention. This characteristic adds a very useful flexibility to the system.

Substantially any conventional carrier transmission or baseband equipment may be used. Specific examples of carrier systems include AM, FM, and phase-modulation. The apparatus of the invention may be applied to teletype systems to double the number of transmission channels available while still using the same frequency bandwidth. Telemetry applications are also possible.

An additional advantage of this improved system is that one slicer is eliminated from the data detector used in the apparatus of the parent application. Since D.-C. slicing levels tend to drift slightly over long periods of time, any error resulting from this drift will be doubled should both slicers drift in the same direction. Where only one slicer is used, as in the present invention, no such doubling is possible.

The invention may be better understood from the more detailed description which follows, referring to the drawings in which.

Figures 1, 1A:
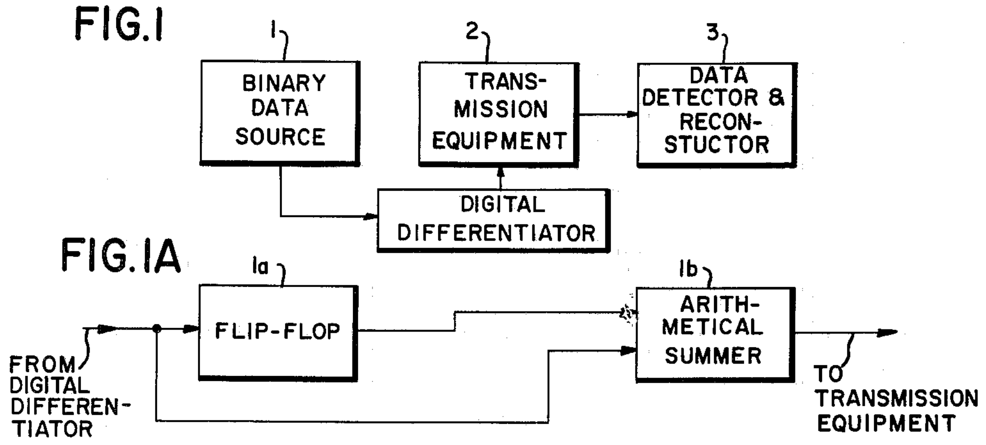
FIGS. 1 and 1A are block diagrams of a data communication system incorporating apparatus embodying the invention.

Referring to FIG. 1, binary data is generated by a data source input 1. The data source used for this invention is conventional; however, the bit rate of the data entering the transmission equipment may be as high as about four times the frequency bandwidth limit of the system. Such a rate is twice that previously possible for a conventional binary system, and equals that previously possible for a quaternary system. In baseband transmission systems, a low-pass filter is invariably used in the transmitter. The bandwidth of this filter determines the system bandwidth, and therefore the maximum possible bit rate. In carrier transmission systems, on the other hand, such a low-pass filter before the carrier modulation equipment is not always used, but a bandpass filter must be employed following the carrier modulator. However, since a carrier-modulated signal has two sidebands, the bandwidth of this bandpass filter must be twice that of a low-pass filter located before the carrier modulation equipment in the system. Therefore the maximum bit rate, calculated as a function of this double-sized bandpass filter, is twice that bandwidth rather four times.

Using the apparatus of the invention, therefore, a reconstructible signal can be transmitted at a bit rate, determined as described above, ranging up to about four times the frequency bandwidth of the system. Although this is not an absolute limit, the error rate above this factor (at 4.5 times the bandwidth, for example) becomes too high. For bit rates below about four times the bandwidth, a conventional lowpass filter is used. The cutoff frequency of this filter is about one quarter of the bit rate. In most applications, operation at maximum transmission speed is desired, and therefore, in practice, the system of this invention is operated at its optimum bit rate of about four times the frequency bandwidth of the system.

In the embodiment shown in FIG. 1A, the transmission speed may be varied at will anywhere within the range of the invention, because conversion to the output waveform occurs before the signal encounters the lowpass filter in the transmitter. (The output waveform is shown, for example, as waveform 16 in FIG. 4). This conversion is performed by flip-flop 1*a* and arithmetical summer 1*b*. An arithmetical summer is merely a pair of resistors connected together at the output; the two inputs are connected to the unconnected ends of the resistors.

The embodiment illustrated in FIG. 1A has yet another advantage. It reduces intersymbol interference, thereby increasing the signal-to-noise level ratio of the receiver.

The transmission equipment 2 is not a part of the invention. In the block 2 designated as transmission equipment, both the transmission medium and the linear carrier modulation equipment (if any) are included. This equipment transmits the data pulses from the data source 1 to the data detector and reconstructor 3. The simplest baseband data transmission system, of course, is a cable; cables have limited bandwidth which fixes the maximum bit speed.

If desired, the data may be carrier-modulated. Because linear-modulation systems are well known in the art, it is not necessary to go into them in detail here. Amplitude modulation, frequency modulation, phase modulation (either analog or coherent digital), or other methods of carrier modulation may be used. A specific example of one type of carrier modulation and transmission equipment, FM, is shown in FIG. 2.

Figure 2:
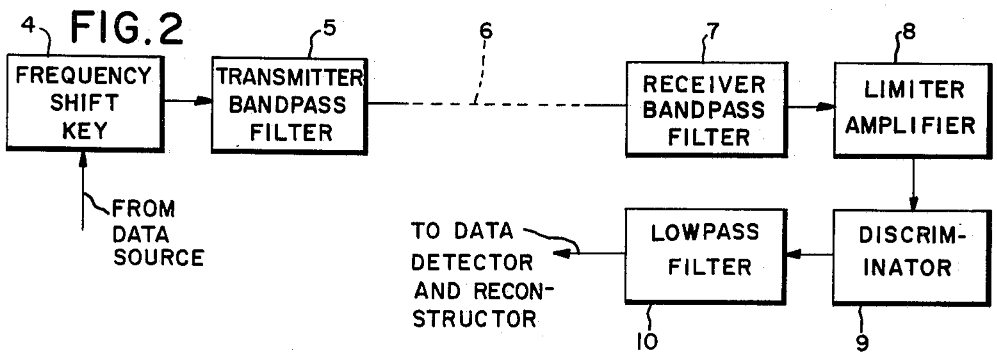
FIG. 2 is a block diagram of FM transmission apparatus.

Referring now to FIG. 2, electric pulses from the data source enter the frequency shift key 4. This key may be a single oscillator keyed in a strictly binary manner by switching a fixed capacitor in or out, thus effectively alternating between two fixed frequencies, according to which of two binary states the signal is in. These two binary states will be referred to here as MARK and SPACE. The binary-keyed wave emitted from the frequency shift key 4 is applied to a transmitter bandpass filter 5. The signal from transmitter bandpass filter 5 is sent across a transmission medium 6 (which may be a cable, h.-f. radio, etc.) to the receiver. The receiver bandpass filter 7, the limiter amplifier 8, the discriminator 9, and the low-pass filter 10 perform linear demodulation. The wave shape of the pulse emitted from lowpass filter 10 is thus the same as it would have been using a cable having the same frequency bandwidth as the lowpass filter between the data source and the output of lowpass filter 10.

Figure 3:
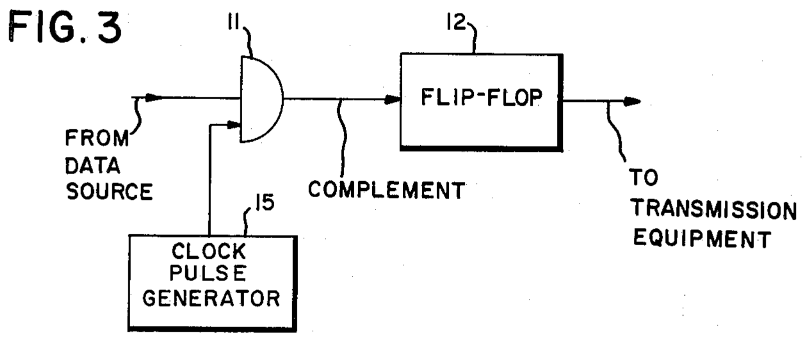
FIG. 3 is a block diagram of a digital differentiator.

The data waveform from the data source is passed through a circuit, herein called a digital differentiator, before transmission. A block diagram of one such digital differentiator is shown in FIG. 3. When a MARK appears from the data source, gate 11 will have an output; otherwise, it will not. An output from gate 11 complements flip-flop 12; as a result, flip-flop 12 changes state only when a MARK appears from the data source. The data waveform is converted from the waveform 13 shown in FIG. 4 to waveform 14. Waveform 14 emerging from flip-flop 12 has been digitally differentiated.

The use of a pulse synchronizing means, such as clock pulse generator 15 shown in FIG. 3, is conventional. The clock pulse generator is set to generate pulses at fixed frequency equal to the bit rate. The clock pulses are phased with the signal. Clock pulse generators are described in greater detail in the reference, Wier, J. M., Digital Data Communication Techniques, Proceedings of the IRE, Vol. 49, January 1961, pp. 196–204.

Figure 4:
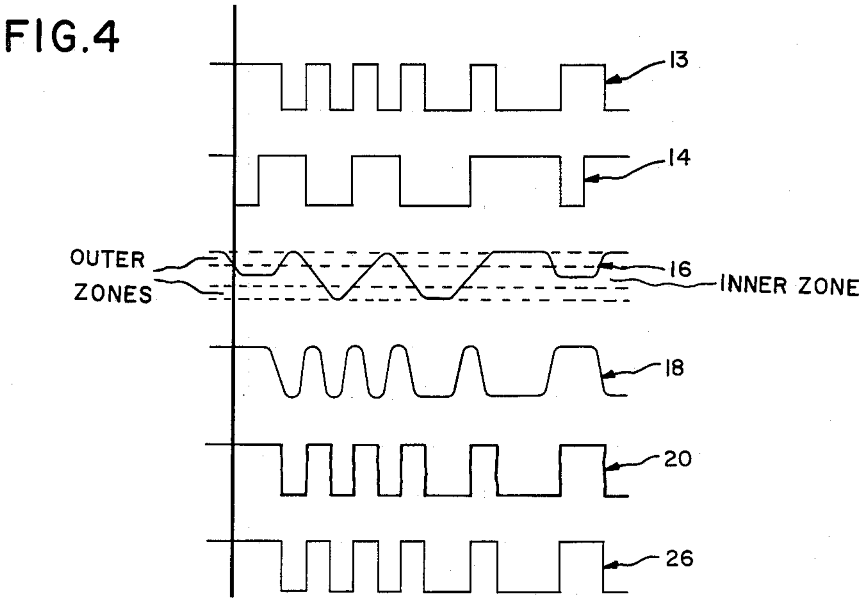
FIG. 4 shows a data waveform at various stages of transmission using apparatus of the invention.
Figure 5:
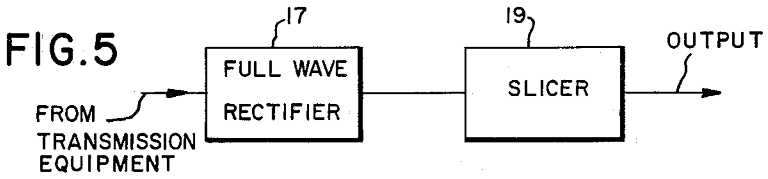
FIG. 5 shows a data detector and reconstructor of a preferred embodiment of this invention which requires no clock.

The digitally differentiated pulse is transmitted in one of the ways described earlier. A data detector and reconstructor of the preferred embodiment of this invention is shown in FIG. 5. The waveform 16 shown in FIG. 4 is received from the transmission equipment. This waveform has three amplitude zones: one inner zone and two outer zones, as shown. This configuration of the waveform 16 is inherently and directly produced from waveform 14 upon transmission of the latter over whatever transmission medium is employed. Whether the transmission medium is as shown in FIGURE 2 with the lowpass filter 10 at its output, is merely a cable, or is otherwise constituted, the medium has some limited frequency bandwidth. As employed in accordance with the present invention, the upper frequency bandwidth limit of the transmission medium is about one-fourth the bit rate of data waveform 14. In other words, the bit rate is about twice that to which the limited bandwidth transmission medium is able to fully respond during the time of a single bit interval. The inherent impulsive response of the medium under these circumstances is such that two bit intervals of the same polarity of the waveform 14 following a bit interval of the opposite polarity are required to effect a departure in waveform 16 from one outer zone to the other or from the inner zone to one of the outer zones. When the waveform 16 is in one of the outer zones as a result of prior bit intervals of a given first polarity and these prior bit intervals are followed by a bit interval of the opposite or second polarity, a transient is established which effects a change from the outer zone to the inner zone during this bit interval of second polarity. Now, if this bit interval of second polarity is followed by another bit interval of second polarity, the transient will be sustained and the variation of waveform 16 continues through the inner zone to the opposite outer zone. However, if the bit interval of second polarity is instead followed by a bit interval of the first polarity, the transient is cancelled while the waveform 16 is in the inner zone. The waveform 16, hence, remains in the inner zone during the bit interval of first polarity although a transient tends to be initiated in the opposite direction to that just described. This transient will be sustained by a successive bit interval of first polarity and cause the waveform 16 to revert to the original outer zone, but will be nullified by a successive bit interval of second polarity to thus cause the waveform to remain in the inner zone. The time intervals required for the foregoing changes in waveform 16 to occur and the configuration of the waveform in undergoing the changes are, of course, quite reproducible by virtue of the clock-pulse governed constancy of the bit intervals of the waveform 14. The waveform is then passed through a full-wave rectifier 17. Such rectifiers are conventional and are usually made from a diode bridge circuit; further description here is not considered necessary for the purposes of the present invention. The waveform emerging from the rectifier is shown as waveform 18 in FIG. 4. The top half of waveform 16 was inverted by the rectifier to produce waveform 18. A reversed input to the rectifier would, of course, invert the bottom half of the waveform rather than the top half, but the net result would be equivalent (except for the binary inversion), for the purposes of this invention. Finally, waveform 18 is passed through a single slicer 19 to square the pulses, as shown by waveform 20 in FIG. 4.

The simplicity of the detection and reconstruction apparatus using just one full-wave rectifier and one slicer is immediately apparent. Waveform 20 is identical to waveform 13, the transmitted waveform. Whenever the amplitude line of waveform 20 is up, a MARK results; when it drops down, a SPACE.

Figure 6:
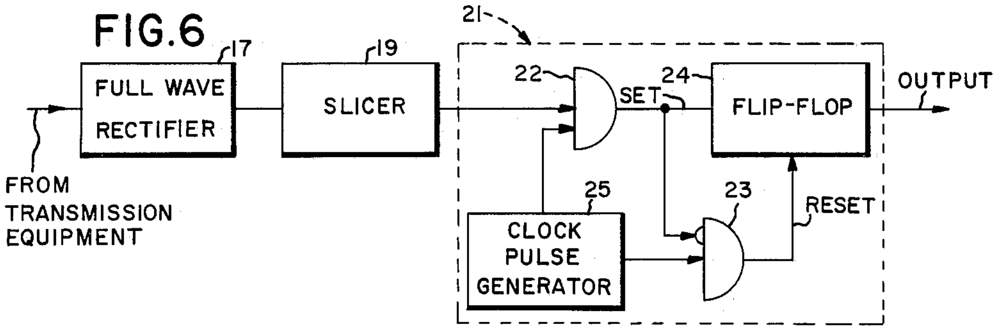
FIG. 6 shows a data detector and reconstructor of another embodiment of the invention.

In the few applications where the amount of time jitter in waveform 20 is appreciable in comparison to the bit duration, the embodiment shown in FIG. 6 may be used to eliminate the jitter. This embodiment uses a retiming circuit 21, which comprises two AND-gates 22 and 23, a flip-flop 24, and a pulse synchronizing means such as clock pulse generator 25. The AND-gates used and described herein are all of the type having an output only when all inputs are positive. The first AND-gate 22 has an input connected to slicer 19. AND-gate 22 has another input connected to clock pulse generator 25. Its output is connected to the SET input of flip-flop 24. The other AND-gate 23 has an input connected through a conventional inhibitor to the SET input of flip-flop 24. An inhibitor inverts the binary state of the signal, changing it from positive to negative, or vice versa. The inhibitor is shown by its standard symbol on AND-gate 23. AND-gate 23 also has another input connected to clock pulse generator 25 and an output connected to the RESET input of flip-flop 24.

Clock pulse generator 25 serves both to generate clock pulses at a rate equal to the bit rate of the transmitted data, and to synchronize these pulses so that they will be in phase with the data pulses. The actual circuitry of the pulse generator and synchronizer is well known. A more detailed description may be found in the Wier reference mentioned above.

Use of the retiming circuit eliminates the slight jitter shown in waveform 20. Waveform 26 shows waveform 20 after it has emerged from the retiming circuit of the embodiment illustrated in FIG. 6. Even with the retiming circuit 21, the data detector and reconstructor of this embodiment requires no more equipment than a conventionary binary data detector and reconstructor, yet it can unambiguously reconstruct data transmitted at a bit rate twice that possible with a conventional binary system.

The system of the invention has other very important advantages. The data detector and reconstructor has no memory because each binary decision is made strictly on the basis of a single pulse. Where decisions must be made on the basis of previous pulses in addition to the single pulse being detected, a multiplication of errors can result, i.e., an error from previous pulses may be repeated.

Another important advantage of the apparatus of this invention is its suitability for use with a phase-modulated carrier. In coherent phase modulation of digital data, the recovered reference carrier is sometimes reversed by 180° in transmission. This reversal would result in the waveform 16 of FIG. 4 having peaks where valleys should be, and vice versa. However, since in the system of this invention both a peak and a valley are identical after passing through the rectifier, a phase reversal makes no difference—the data detector and reconstructor will arrive at exactly the same result in either event.

The substantial advantages provided by the apparatus of this invention, particularly the preferred embodiment shown in FIG. 5, will be apparent from the following comparative example.

*Example*

A system having the data detector and reconstructor shown in FIG. 5 was tested using an optimized FM transmission apparatus shown in FIG. 2. The system was designed for a parallel 16-channel application for a total of 2,560 bits per second over high-frequency radio voice channels. All channels had identical bandwidths. The test was conducted with only a single channel whose parameters were as follows:

| | |
|---|---|
| Bit speed | 160 bits/second. |
| Center frequency | 2125 c.p.s. |
| Shift frequencies | 2085 c.p.s. and 2165 c.p.s. |
| Channel bandwidth | 100 c.p.s. |
| Thermal noise | Flat. |

The input signal was unambiguously reconstructed at the output in spite of the substantial increase in bit speed over a conventional binary system.

As will be obvious to one skilled in the art, many modifications and variations can be made in the system disclosed above which are still within the spirit and scope of the invention. Therefore the only limitations to be placed on the scope of the invention are those expressed in the following claims:

What is claimed is:

Apparatus for the transmission of binary data over a transmission channel of limited frequency bandwidth, which comprises:

means for supplying to the transmission channel electric pulses representing binary data to be transmitted at a bit rate of the order of four times the frequency bandwidth limit of said channel;

means for digitally differentiating said electric pulses before transmission;

means for arithmetically summing said pulses with themselves delayed by a one-bit duration, whereby an electric signal is transmitted having three detectable amplitude zones consisting of an inner zone and two outer zones;

rectifying means for rectifying the received signal, whereby the portion of said received signal which lies in one of said two outer zones is transferred to the other of said two outer zones, thereby producing a resulting electric signal having only two amplitude zones, one of which is said inner zone and the other of which is said other outer zone;

means for detecting said electric pulses from the output of said rectifying means; and retiming means for removing jitter from the detected signal, said retiming means including a first AND-gate having a first input connected to the output of said detecting means, a pulse synchronizing means connected to a second input of said first AND-gate, a flip-flop having one of its SET and RESET inputs connected to the output of said first AND-gate, and a second AND-gate having an input connected through an inhibitor to the output of said first AND-gate, having another input connected to said pulse synchronizing means, and an output connected to the other of said SET and RESET inputs of said flip-flop.

References Cited by the Examiner

UNITED STATES PATENTS

| | | | |
|---|---|---|---|
| 1,233,519 | 7/1917 | Squier | 178—67 |
| 2,912,684 | 11/1959 | Steele | 178—67 |
| 3,162,724 | 12/1964 | Ringelhaan | 178—68 |

OTHER REFERENCES

McGuire, R. C.: A Simple Synchronizing Circuit, IBM Technical Disclosure Bulletin 3:9, p. 19, February, 1961.

DAVID G. REDINBAUGH, *Primary Examiner.*

J. P. MOHN, S. J. GLASSMAN, *Examiners.*